(12) United States Patent
Kobayashi

(10) Patent No.: US 8,388,796 B2
(45) Date of Patent: Mar. 5, 2013

(54) METHOD AND STRUCTURE FOR BONDING METAL MEMBER TO BE BONDED

(75) Inventor: Masato Kobayashi, Fukuyama (JP)

(73) Assignee: Nihonkansen Kogyo Kabushiki Kaisha, Fukuyama-shi, Hiroshima (JP)

( * ) Notice: Subject to any disclaimer, the term of this patent is extended or adjusted under 35 U.S.C. 154(b) by 413 days.

(21) Appl. No.: 12/735,004

(22) PCT Filed: Nov. 27, 2008

(86) PCT No.: PCT/JP2008/071489
§ 371 (c)(1),
(2), (4) Date: Jun. 9, 2010

(87) PCT Pub. No.: WO2009/084348
PCT Pub. Date: Jul. 9, 2009

(65) Prior Publication Data
US 2010/0288438 A1  Nov. 18, 2010

(30) Foreign Application Priority Data
Dec. 27, 2007 (JP) ................ 2007-337449

(51) Int. Cl.
| | |
|---|---|
| B29C 47/00 | (2006.01) |
| B29C 65/00 | (2006.01) |
| B32B 37/00 | (2006.01) |
| F02F 1/06 | (2006.01) |
| F16L 25/00 | (2006.01) |
| F16L 35/00 | (2006.01) |
| F16L 13/00 | (2006.01) |
| B25G 3/34 | (2006.01) |
| F16B 11/00 | (2006.01) |
| F16B 12/04 | (2006.01) |

(52) U.S. Cl. .............. 156/294; 156/244.13; 156/244.24; 156/303.1; 285/331; 403/268; 403/293; 403/361

(58) Field of Classification Search .................... 156/60, 156/71, 242, 244.11, 244.13, 244.24, 245, 156/292, 293, 294, 295, 296, 303.1, 304.1, 156/304.2; 285/328, 331; 403/263, 268, 403/293, 345, 361, 376
See application file for complete search history.

(56) References Cited

U.S. PATENT DOCUMENTS
3,963,162 A * 6/1976 Taguchi et al. ............... 228/134
(Continued)

FOREIGN PATENT DOCUMENTS
| JP | 55-093411 | 7/1980 |
|---|---|---|
| JP | 55-115679 | 9/1980 |

(Continued)

OTHER PUBLICATIONS

Effects of Coupling Shape to the Strength of Metallic Glued Hollow Shaft Coupling, Japanese Mechanics Society Collection (vol. A) vol. 52 No. 477 (May 1986) p. 1252-1256.

(Continued)

Primary Examiner — Philip Tucker
Assistant Examiner — Brian R Slawski
(74) Attorney, Agent, or Firm — Merek, Blackmon & Voorhees, LLC

(57) ABSTRACT

A metal member (3) is bonded with an adhesive (6) to have a bond strength higher than the basic material strength of the metal member (3). A metal insertion coupling has a socket portion (4) in which an insertion hole (2a) for inserting the end portion of the metal member (3) is formed. The socket portion (4) has a tapered outer surface extending from the opening end to the back side. The tensile strength of the socket portion (4) at the deepest position along the center line of the insertion hole is equal to or higher than the tensile strength of the metal member (3) in the direction of the center line. The insertion hole (2a) has a width 0.2 mm-0.6 mm larger than that of the end portion of the metal member (3). The end portion of the metal member (3) is pressed into the insertion hole (2a), and an adhesive exists densely between the end portion of the metal member (3) and the surface of the insertion hole (2a), by quenching or cold working the end portion of the metal member (3).

7 Claims, 13 Drawing Sheets

U.S. PATENT DOCUMENTS

2008/0136176 A1 * 6/2008 Katayama et al. ............. 285/256
2009/0045621 A1 * 2/2009 Heraud et al. ............. 285/286.2

FOREIGN PATENT DOCUMENTS

| JP | 05-039887 | | 2/1993 |
| JP | 05-346187 | | 12/1993 |
| JP | 06-257607 | | 9/1994 |
| JP | 09-217883 | | 8/1997 |
| JP | 09217883 A | * | 8/1997 |
| JP | 10-146681 | | 6/1998 |
| JP | 2001-182874 | | 7/2001 |
| JP | 2002-295420 | | 10/2002 |
| WO | WO 2007110501 A1 | * | 10/2007 |

OTHER PUBLICATIONS

Microfilm of the specification and drawings annexed to the request of JapaneseUtility Model Application No. 183902/1986 (Laid-open No. 087383/1988)(NEC Kansai, Ltd.), Jun. 7, 1988.

* cited by examiner

US 8,388,796 B2

METHOD AND STRUCTURE FOR BONDING METAL MEMBER TO BE BONDED

CROSS-REFERENCE TO RELATED APPLICATION

The present application claims the priority under 35 U.S.C. 119 of Japanese Application No. 2007-337449, filed Dec. 27, 2007, which is hereby incorporated herein by reference in its entirety.

FIELD OF THE INVENTION

This invention relates to a method for bonding metal members, such as metal pipes (steel pipes, iron pipes, stainless pipes and so on) or steel boards, with an adhesive rather than by welding, and a metal insertion coupling to be used in the method.

PRIOR ART

Bonding members of non-metal materials to a coupling having a certain shape with an adhesive is described in Japanese patent provisional publication No. 9-217883 and Japanese patent provisional publication No. 5-346187.

Japanese patent provisional publication No. 9-217883 discloses a technology for bonding ends of hard vinyl chloride pipes by inserting them into, and adhering them in, an insertion hole of a socket portion of a pipe coupling made of the same material.

In this technology, the circumference of the insertion hole of the socket portion is formed in a tapered surface decreasing in diameter gradually from an opening side to a back side, and an outside surface of an outer circumference of the socket portion is formed in a tapered surface decreasing in diameter gradually from the back side to the opening side. In bonding the end of the hard vinyl chloride pipe to the socket portion, an adhesive is painted on an outer circumference of the end of the hard vinyl chloride pipe and the circumference of the insertion hole, and thereafter, the end of the hard vinyl chloride pipe is pressed into the insertion hole.

According to this, because both the hard vinyl chloride pipe and the pipe coupling are made of hard vinyl chloride materials, a swelling layer having a thickness of about 0.1 mm is formed on the surfaces on which the adhesive is painted. Besides, because the end of the hard vinyl chloride pipe is pressed into the insertion hole of the socket portion, the swelling layers contact one another in a consolidation state to give the required adhesive strength.

In addition, because the outer circumference of the socket portion is formed in a tapered surface decreasing in diameter gradually from the back side to the opening side, a sudden shape-change in bonding structure in the opening end surface of the insertion hole of the socket portion, wherein the hard vinyl chloride pipe and the socket portion are bonded, can be avoided. According to this, the following two effects can be obtained.

One is that stress concentration due to the above-mentioned discontinuous shape is controlled to prevent breakage near the opening end surface of the hard vinyl chloride pipe.

The other is that a bad effect on the hard vinyl chloride pipe caused by a solvent of the adhesive, which leaks onto the outer circumference of the pipe near the end surface of the opening when the adhesive is painted on the end of the hard vinyl chloride pipe and the insertion hole and when the end of the pipe is pressed into the insertion hole, can be avoided effectively. Because the shape change of the socket portion at the opening end surface is small, the leaked adhesive can be completely wiped off and removed.

Furthermore, Japanese patent provisional publication No. 5-346187 discloses a bonding technique wherein an end of a GFRP (glass fiber reinforced plastics) pipe is inserted into and adhered in an insertion hole of a socket portion of a pipe coupling made of the same material.

In this technique, the insertion hole of the socket portion of the pipe coupling has a circumference formed in a tapered surface decreasing in diameter gradually from the opening side to the back side, and an outside surface of an outer circumference of the socket portion is formed in a straight uniform sectional shape. On the other hand, the outer circumference of the end of the GFRP pipe is formed in a tapered surface decreasing in diameter gradually toward the end surface. In bonding the end of the GFRP pipe to the socket portion, adhesive is painted on the outer circumference of the end of the GFRP pipe and the inner circumference of the insertion hole, and thereafter, the end of the GFRP pipe is pressed into the socket portion.

According to this, because the socket portion is formed in the tapered surface decreasing in diameter gradually from the opening side to the back side, a sudden shape-change on the opening side end surface of the socket portion can be avoided in a state where the GFRP pipe is bonded to the socket portion, as in Japanese patent provisional publication No. 9-217883. As a result, it is expected that stress concentration due to a sudden shape-change hardly occurs near the opening side end surface of the socket portion at the time when an external force acts, and the breakage of the GFRP pipe can be avoided.

In the publication "Effects of Coupling Shape to the Strength of Metallic Glued Hollow Shaft Coupling", Japanese Mechanics Society Collection (Volume A), vol. 52, No. 477 (1986-5) P1252-, a tapered shaft coupling was studied long ago, and it has been reported that the tapered shape increases tensile strength.

DISCLOSURE OF THE INVENTION

Problems to be Solved by the Invention

It has been desired to apply the bonding of metal members with a strength equal to or higher than the tensile strength of the metal members in the direction of the central line of the metal members without welding to the construction of a piping structure or to a general architectural structure.

When steel pipes are welded, high temperatures are involved. Therefore, it is necessary to confirm that the high temperatures have completely dissipated.

On the other hand, in the techniques disclosed in Japanese patent provisional publication No. 9-217883 and Japanese patent provisional publication No. 5-346187, the hard vinyl chloride pipes or the GFRP pipes are bonded with an adhesive. However, the steel typical of metal pipes or metal bars has a large specific gravity in comparison with the material of hard vinyl chloride pipes or GFRP pipes, and different properties in transformational strength and viscosity. Besides, the steel products are chemically unfamiliar to the adhesive. Therefore, they are not discussed as the same things.

Unlike Japanese patent provisional publication No. 9-217883 and Japanese patent provisional publication No. 5-346187, the publication "Effects of Coupling Shape to the Strength of Metallic Glued Hollow Shaft Coupling", Japanese Mechanics Society Collection (Volume A), vol. 52, No. 477 (1986-5) P1252 refers to metal pipes, stating that stress concentration due to shape-change is hard to occur on the end surface of a socket portion of a coupling formed in a taper. However, in this loading test, the coupling ruptures with a load smaller than the 400 MPa tensile strength of general rolled steels, which is a resultant force of tensile force (180 MPa) and torsion stress (180 MPa). In this publication, it is considered that the coupling was ruptured, because plastic deformation occurred on the metal pipe outside the coupling, and initial breakage occurred in a bond layer and a boundary face of the coupling end. This discloses that bond strength does not exceed the strength of the metal pipe only by the taper form.

In addition, in the publication "Effects of Coupling Shape to the Strength of Metallic Glued Hollow Shaft Coupling", Japanese Mechanics Society Collection (Volume A), vol. 52, No. 477 (1986-5) P1252, it is reported that the thickness of the bond layer is 0.05 mm. However, if the difference between the inner circumferential diameter of the socket portion of the coupling and the outer circumferential diameter of the metal pipe to be inserted therein is up to 0.1 mm, it is very difficult to make the thickness 0.05 mm over the whole area of the bonded surface, because the adhesive painted between the metal pipe and the socket portion is shaved off and lost.

When bonding metal pipes, a welding method is commonly used. The thicknesses of the couplings to be used are required in accordance with the steel pipe to be bonded by industrial standards, for example, the Japanese Industrial Standards (JIS). Concretely, the coupling requires the thickness such as the basic material of the steel pipe to be bonded to be cut in a tensile test. Besides, bonding by welding requires weld strength such as the basic material of the steel pipe is cut, too. As shown in FIG. 3, the side of the coupling 200 is provided such that the leg length is extended to the outer circumference of the metal pipe. Here, the inner circumference of the socket portion of the coupling and the outer circumference of the metal pipe merely contact each other, and do not guide the bond strength.

In considering the strength required to sever the basic material of the steel pipe according to the Japanese Industrial Standards, the breakage occurs on the bonded portion of the coupling side in the bond method of the publication "Effects of Coupling Shape to the Strength of Metallic Glued Hollow Shaft Coupling", Japanese Mechanics Society Collection (Volume A), vol. 52, No. 477 (1986-5) P1252. Therefore, this method can not be used for bonding the steel pipes.

Means to Solve the Problem

This invention aims to bond a metal member with an adhesive so as to obtain a bond tensile strength equal to or higher than the tensile strength of the basic material of the metal member to be bonded.

To achieve this object, a method for bonding a metal member related to this invention is as follows. A metal insertion coupling having a socket portion having an insertion hole for inserting the end of the metal member and being bonded with an adhesive is formed. The socket portion has a tapered outer surface extending gradually from the opening end to the back side. The tensile strength of the socket portion at the deepest position in the direction of the center line of the insertion hole is equal to or higher than the tensile strength of the metal member in the direction of the center line. In the metal insertion coupling, the insertion hole is formed to have a width in the range of 0.2 mm-0.6 mm larger than the end portion of the metal member. The metal member to be bonded is bonded in a state where the end portion of the member is pressed into the insertion hole and the adhesive exists densely between the end portion of the metal member and the inner surface of the insertion hole, by performing quenching or cold working to the end portion of the metal member.

In addition, in the method for bonding a metal member according to this invention, ball members can be positioned between the metal member to be bonded and the inner surface of the insertion hole in a monolayer or in all directions.

Besides, in a structure for bonding a metal pipe and a coupling according to this invention, a socket portion of the coupling is formed as follows. An inner circumference of an insertion hole for inserting the metal pipe is formed in a circular cylinder almost concentrically with the corresponding socket portion. The socket portion has a tapered outer surface extending gradually from the opening end to the back side. The tensile strength of the socket portion at the deepest position in the direction of the center line of the insertion hole is equal to or higher than the tensile strength of the metal member in the direction of the center line. The outer circumference of the end portion of the metal pipe is parallel to the above-mentioned circular cylinder. The cylinder is formed to have an inner diameter in the range of 0.2 mm-0.6 mm larger than an outer diameter of the metal pipe. The end portion of the metal member is quenched or cold worked, and an adhesive exists densely between the outer circumference of the end portion of the metal pipe and the circumference of the insertion hole.

Effects of the Invention

According to this invention, the transformation of the end portion of the metal member to be bonded, which is caused when the tensile force in the direction of the center line of the metal member to be bonded acts on the structure for bonding the end portion and the metal insertion coupling, can be prevented because the end portion is hardened through quenching or cold working. Therefore, stress is properly decentralized by the taper effects, and an adhesive can exhibit the adhesive force specified. Accordingly, if the bond area is set up so that the adhesive force is higher than the strength of the basic material of the metal member to be bonded, the basic material is severed when the tensile force is excessive.

PREFERRED EMBODIMENT OF THE INVENTION

The following is an example of the invention with reference to the figures.

At first, a metal insertion coupling for plumbing, which is used in this example, will be explained.

Figure 1:
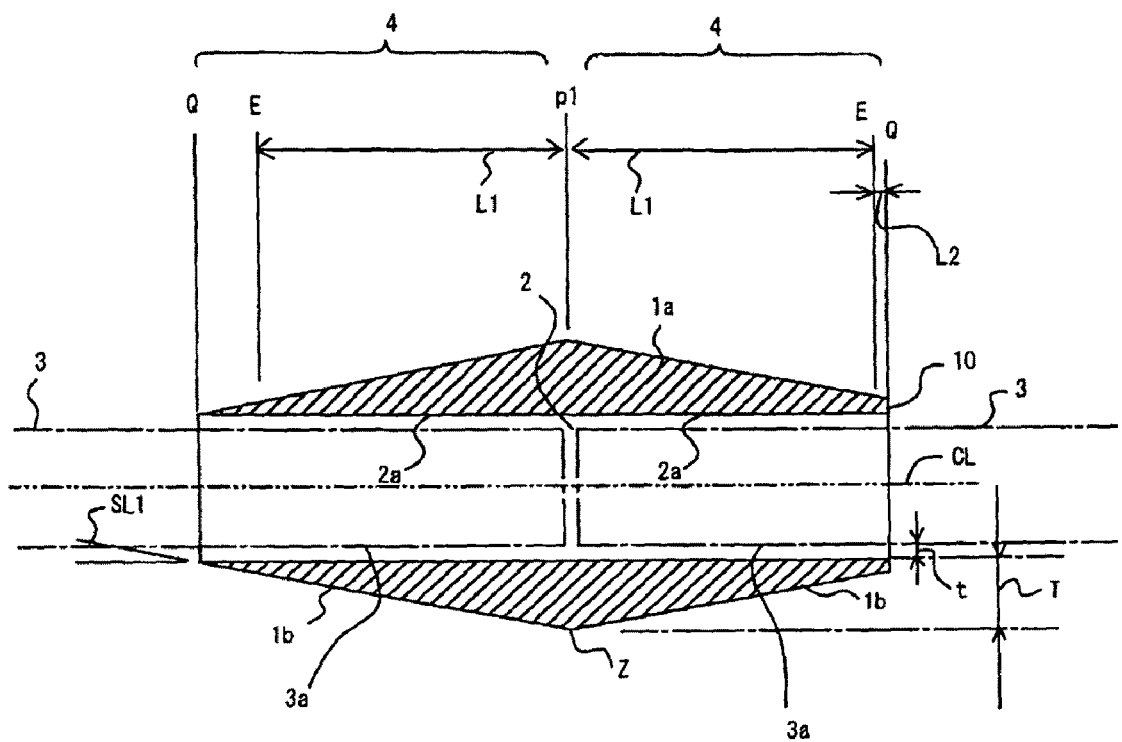
FIG. 1 is a sectional view of a metal insertion coupling according to the present invention.

FIG. 1 is a sectional view of the metal insertion coupling.

In FIG. 1, a metal insertion coupling 1a is a single cylinder made of metal material, having a straight hole 2 at the center. As the metal material, for example, FC (Fine Ceramics), SS (Stainless Steel), SF (Carbon Steel Forgings), SC (Carbon Steel Castings), which comply with the Japanese Industrial Standards (JIS), are generally used. The material is not limited to these and may be a different one suitable for a metal pipe (metal member to be bonded, metal plumbing) 3 to be bonded to the coupling 1a.

The metal insertion coupling 1a has a central (in the length direction) portion p1 that contains the maximum diameter of the coupling. The central portion p1 divides the metal insertion coupling 1a symmetrically. The straight hole 2 is composed of a cylindrical surface whose sections are equal. End portions Q of the coupling 1a in the length direction (one at a left half position, and the other at a right half position) open in the left direction and the right direction, respectively. In the end portions Q, through a length ranging to the back side (a half length of a coupling body 1), the end portions each have an insertion hole 2a in which the end portion 3a of a corresponding metal pipe 3 is inserted. The right and left half portions of the coupling 1a near the central portion p1 form right and left socket portions 4, respectively. Each socket portion 4 has a tapered surface the diameter of which diminishes gradually from the back side to the opening. A section of the end of the opening of the socket portion 4 forms a knife edge. However, as shown on the right side of FIG. 1, the end portion can be cut off by cutting on the surface orthogonal to a center line CL of the socket portion 4, so that the metal pipe 3 and the coupling 1a can be bonded easily and precisely. In the example of FIG. 1, the end of the opening of the right socket portion 4 is located at a position Q that is several millimeters nearer the central portion p1 than is the end of the opening of the left socket portion 4. An opening end surface 10 having a radial width is formed on the right socket portion 4 at the position Q. In this figure, a distance L1 from the portion p1 to a point E is a minimum necessary length as later discussed, and a distance L2 is an interval from the opening end surface 10 to the point E. The place that is cut and the portion that is cut off exist outside the point E.

Next, the bonding structure based on this example will be explained in the following order:

(A) . . . Choice of materials and the diameter of the metal pipe (B) . . . Material and the thickness of the coupling body (C) . . . Shape and the bond area of the coupling body (D) . . . The thickness of the adhesive (E) . . . Treatment of the portion of the pipe to be bonded.

(A) Choice of Materials and the Diameter of the Metal Pipe

The materials and the diameter of the metal pipe 3 are chosen in accordance with the requirements of use. According to this, the diameter of the circumference of the insertion hole 2a of the coupling 1a is determined. That is, the diameter of the insertion hole 2a is larger than the outer diameter of the end portion 3a of the metal pipe 3 to be inserted by a dimension in the range of 0.2 mm-0.6 mm.

The significance of placing the lower limit at 0.2 mm depends on the operations. When it is smaller than 0.2 mm, the distance between the insertion hole 2a and the end portion 3a of the metal pipe 3 becomes smaller than 0.1 mm. As a result, it is difficult to insert the end portion 3a into the insertion hole 2a, and it is difficult to standardize the thickness of the adhesive layer existing between the circumference of the insertion hole 2a and the end portion 3a of the metal pipe 3. On the other hand, the significance of placing the upper limit at 0.6 mm relates to the bond strength. When it is larger than 0.6 mm, the interval between the insertion hole 2a and the end portion 3a of the metal pipe 3 becomes larger than 0.3 mm, and the bond strength of the adhesive layer falls drastically.

Figure 2:
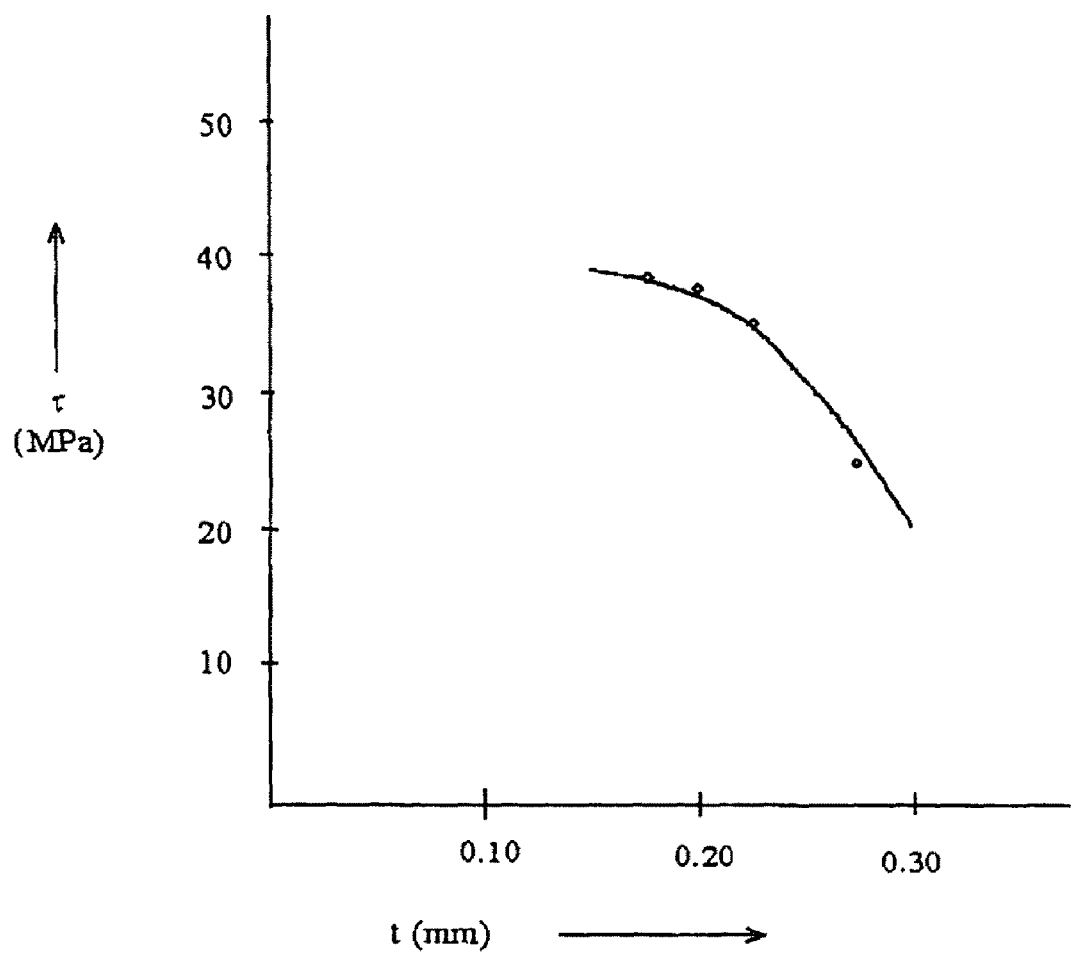
FIG. 2 is a graph showing the relationship of the thickness of an adhesive layer and the bond strength thereof in accordance with the present invention.

FIG. 2 shows the relation of the thickness of the adhesive layer and the bond strength. An axis of abscissas shows the thickness t of the adhesive layer, and an axis of ordinates shows the shearing stress $\tau$ (break strength of the adhesive layer) at the time when the adhesive layer is broken. As shown in FIG. 2, in the range where the thickness of the adhesive layer is larger than 0.17 mm, the shearing stress $\tau$ drops at a large ratio as the thickness of the adhesive layer increases. Accordingly, to keep the strength of the adhesive layer effective, it is preferable that the thickness t of the adhesive layer is made no greater than 0.3 mm. More strictly speaking, it is preferable that it is made no greater than 0.17 mm.

(B) Material and the Thickness of the Coupling Body

Figure 3:
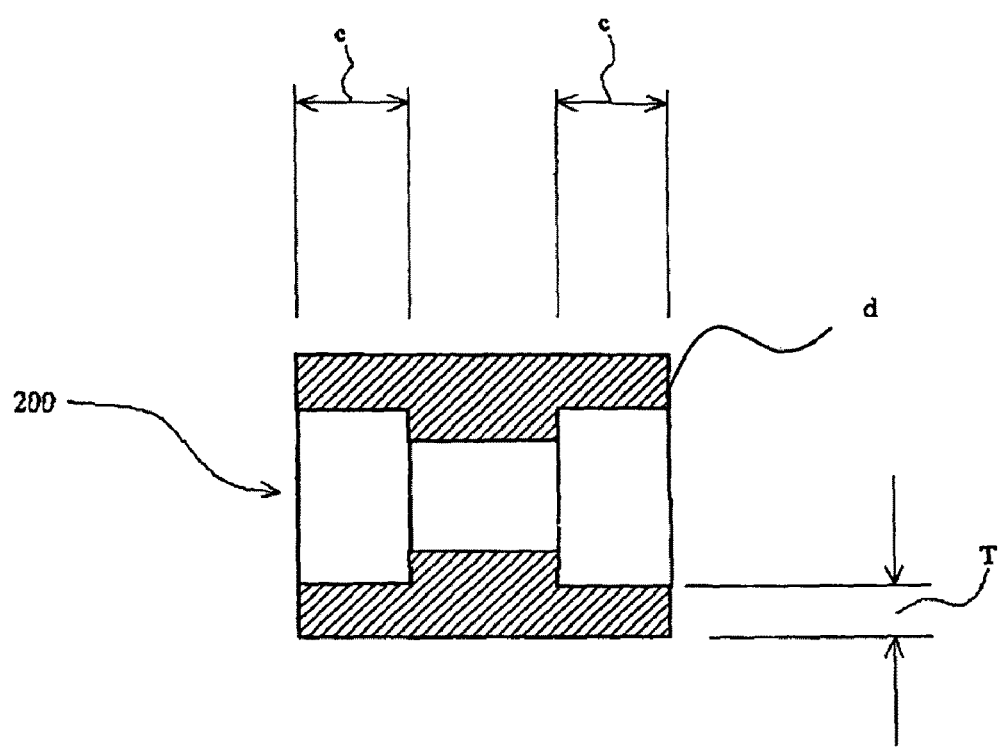
FIG. 3 is a sectional view of an insertion coupling according to the present invention that complies with the Japanese Industrial Standards.

FIG. 3 is a sectional view of an insertion coupling 200 for laying pipe related to the conventional Japanese Industrial Standard JIS B 2316-1986. The coupling 200 has been already used in various kinds of pipe laying, and the socket portion thickness T (JIS thickness) for satisfying the required strength is provided at every diameter.

JIS B 2316-1986 prescribes sch80 and sch160 for the metal insertion couple 200 in the case of FC (Fine Ceramics) material. When bonding metal pipes 3 having a smaller pipe thickness than sch80, the thickness T of sch80 is made a standard. In addition, when bonding metal pipe 3 having a pipe thickness from the sch80 thickness to the sch160 thickness, the thickness T of the sch160 is made a standard. The thickness of the insertion coupling 1a at the deepest position (p1) of the socket portion is made no less than the socket portion thickness T according to the JIS.

(C) Shape and the Bond Area of the Coupling Body

The area of the bonded surface (bond area) necessary for the adhesive layer is calculated by multiplying the diameter of the outer circumference of the metal pipe 3 to be inserted into the insertion hole 2a, the length L1 (the length in a direction of a center line CL) of the socket portion 4 in the adhesive layer, and the circular constant $\pi$. The length L1 is the minimum necessary length (the bonding length from calculating the strength) in the direction of the center line of the socket portion 4 in the adhesive layer. The bond area is so chosen that the adhesive layer does not receive stress higher than a stress that the bond can withstand (shearing stress at the time when the adhesive layer is broken), even if the same force would break the metal pipe that is the metal member 3 to be bonded.

Where the tensile breaking force of the metal pipe is F1, the minimum necessary length L1 is calculated by the following expression (1):

$$L1 = F1/\pi r \tau$$

Here, τ is the bonding strength of the adhesive (shearing stress per unit area at the time when the adhesive layer is broken), and r is the outer diameter of the metal pipe.

In this way, the minimum necessary length L1 is determined, and the adhesive is applied from the deepest position p1 of each of the right and left socket portions 4 to a position (E) that is only the minimum necessary length L1 away from the opening side of the socket portion 4.

Next, the opening end is positioned. The opening end is set at a position (Q) that is at the position E or farther away from the position p1 than the position E is. A tapered surface 1b forming the outer circumference of the socket portion 4 is made so as to include a straight line SL1 connecting the position Q and an outer circumference position Z which is higher than a thickness T at the deepest position (p1) of the socket portion. According to this, the tapered surface 1b is defined. Here, the angle of the taper is preferably 3 degrees to 12 degrees. As the angle becomes smaller, the distortion due to stress decreases. When the angle is small, the thickness of the opening end of the coupling is thin and therefore the strength of the opening end is small. On the other hand, when the angle is large, the thickness at the deepest position of the socket portion 4 is thick, and the cost of materials increases. Accordingly, it is preferable that the angle is in the range of 5 degrees to 7 degrees for a real product.

The taper shape is superior for dispersing stress. However, the stress distortion on the opening portion of the socket portion is larger than that of another bonded portion for any taper angle. Accordingly, the stress distortion of the opening portion, which is generated when a tensile force equal to the basic material strength of the metal pipe is applied, may be made so as not to exceed the bonding strength of the adhesive. In addition, it is preferable that the length of the taper portion be long to disperse the stress, and therefore, the slant goes to a position just over the deep position of the socket portion, at least to where the tip of the metal pipe reaches.

In the metal insertion coupling 1a, the circumference of the insertion hole 2a in each socket portion 4, from the position E to the opening end Q, is bonded to the end portion 3a of the metal pipe 3 with the adhesive. According to this, the metal insertion coupling 1a has improved strength. In this case, the metal insertion coupling 1a can be so constructed that water is prevented from reaching the deep position between the insertion hole 2a and the end portion 3a of the metal pipe 3 by fitting a ring sealing member at an optional position between the circumference of the insertion hole 2a and the end portion 3a of the metal pipe 3, from the position E to the opening end Q.

(D) The Thickness and the Homogeneity of the Adhesive

Next, the metal pipes 3 are bonded to the above-mentioned coupling 1a as follows. Here, FIG. 4 is a sectional view showing a bonding structure in which a metal pipe is inserted into the metal insertion coupling.

The metal insertion coupling 1a to be prepared has an insertion hole 2a larger than the outer diameter of the metal pipe 3 by 0.2-0.6 mm.

Figure 4:
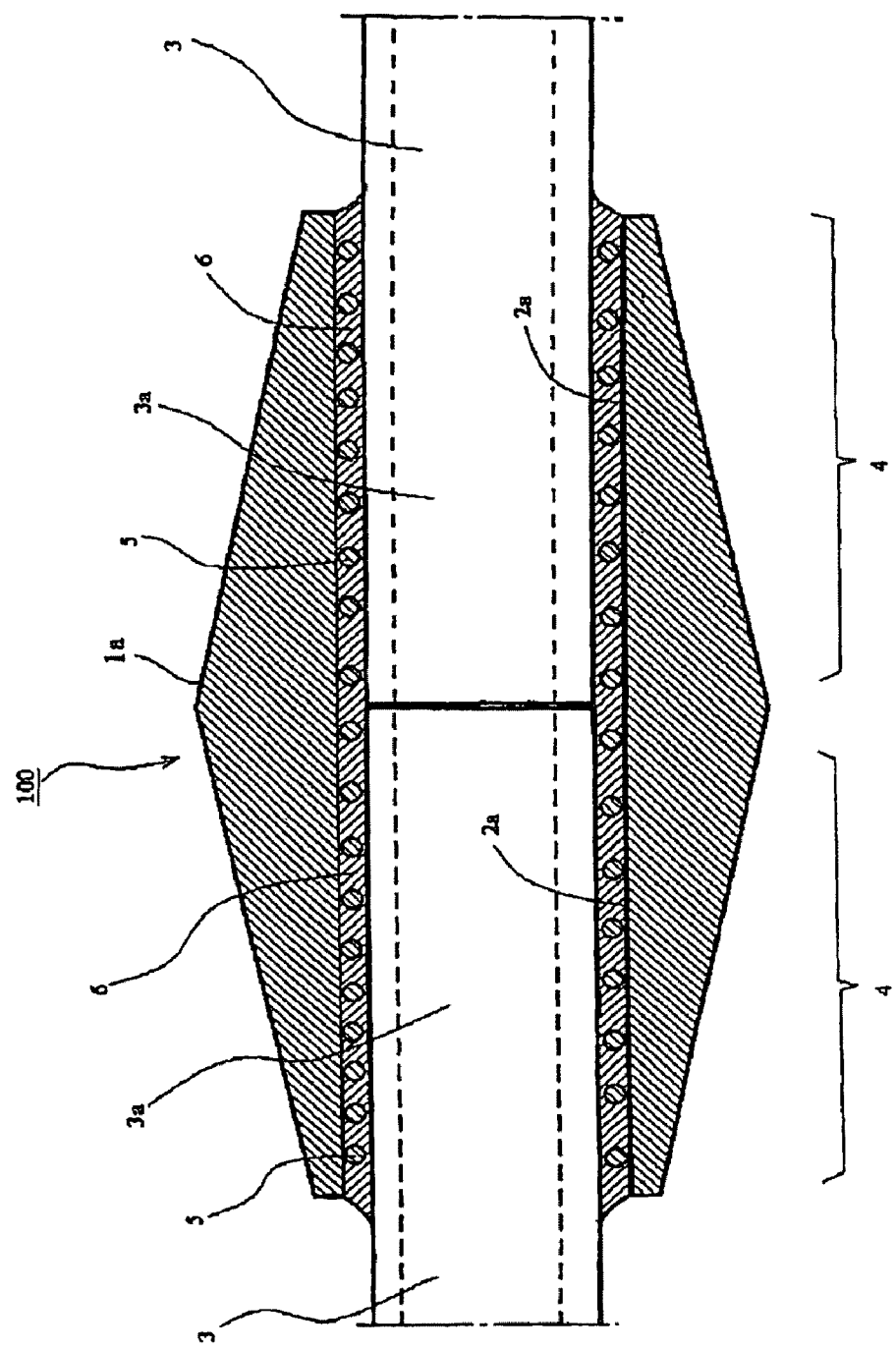
FIG. 4 is a sectional view showing the bonding structure where a metal pipe is inserted into a metal insertion coupling in accordance with the present invention.

As shown in FIG. 4, the end portion 3a of the metal pipe 3 is inserted into the insertion hole 2a of the socket portion 4 of the coupling 1a, and many ball members 5 are positioned between the outer circumference of the end portion 3a and the circumference of the insertion hole 2a in a single layer and in dots. Here, the ball members 5 are densely painted with an adhesive 6.

Then, the adhesive 6 (may be equal to the adhesive for painting on the ball members 5) is painted on the outer circumference of the end portion 3a and/or the whole circumference of the insertion hole 2a of the socket portion 4, and thereafter, the end portion 3a is pushed to the position p1 inside the insertion hole 2a. Here, the position p1 (the deepest position) is a predetermined position. Then, these conditions are maintained until the adhesive 6 solidifies so as to keep, by its adhesive strength, the relative positions of the metal pipe 3 and the socket portion 4.

The adhesive 6 overflowing from the insertion hole 2a at the time when the end portion 3a is pushed therein is wiped before it solidifies.

Thereafter, there is a wait until the adhesive 6 develops the predetermined strength.

In this case, a liquid heat-curing epoxy structural adhesive (for example, Sumitomo 3M Co. Ltd., "Scotch-WeldXA7416" etc.) is preferably used as the adhesive 6. The adhesive strength of the bonded surface is increased by degreasing and by painting a primer.

The ball members 5 can be made of metal, ceramics or glass. For example, if beads are used, it is possible to prepare easily beads each having a desired diameter. In the case of ceramics or glass, they may be broken by an impact at the time when the metal pipe 3 is inserted. Therefore, it is necessary to operate carefully. The diameter of the ball members 5 is made to be in the range from the predetermined minimum thickness of the layer of the adhesive 6 to the predetermined maximum thickness. For example, when the adhesive 6 is a liquid heat-curing epoxy structural adhesive, the diameter is generally within the range of 0.1 mm-0.25 mm.

Figure 5:
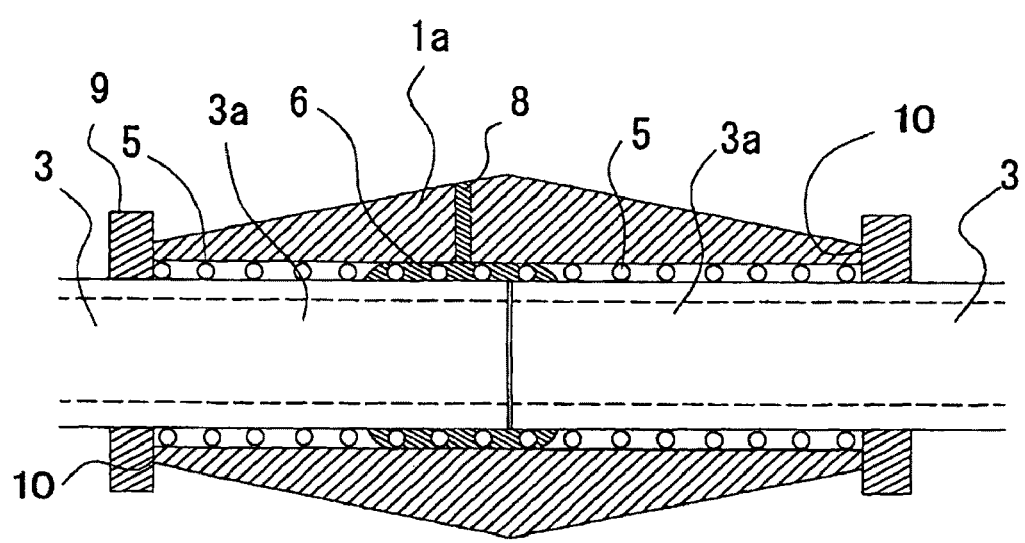
FIG. 5 is a sectional view showing a method for pouring an adhesive in accordance with the present invention.

In setting the ball members 5 on the bonding surface in advance, it is possible to keep a space between the metal pipe 3 and the inner circumference of the insertion hole 2a. Therefore, it is possible to supply the adhesive to the bonding surface by forcing the adhesive into a through hole which links the outer circumference, around the center of the metal insertion coupling 1a, to the inside bonding surface, and then insert the metal pipe 3. For example, in FIG. 5, an opening end surface 10 is sealed with a block 9 when the ball members 5 are set on the bonding surface in advance. A through hole 8 is provided in the metal insertion coupling 1a, and the air is let out of it so as to form a vacuum. Thereafter, the adhesive 6 is poured into the space through the through hole 8.

As an alternative, a space of 0.1 mm-0.3 mm can be kept over the whole bonding surface by precisely fixing the metal pipe 3 and the metal insertion couple 1a with a tool and without the ball members 5. In this case, the operation is difficult to be carried out at building site, and can be carried out with only indoor materials needed for the manufacture of machinery in a laboratory or a factory. Although the ball members 5 may be mixed into the adhesive in advance, it is necessary to arrange the ball members 5 in a single layer.

(E) Treatment of the Portion of the Pipe to be Bonded

Previous to the adhesion, the end portion 3a is stiffened. The end portion 3a is heated beyond an austenite condition, then rapidly cooled with a suitable refrigerant to be stiffened as a martensitic structure. This is known as a quenching method. In this case, to increase the carbon amount in a surface layer of the steel, the quenching method may be carried out after heating in a carburizer. According to this method, the strength is increased while the end portion 3a is hardly changed. Cold working to provide plastic transformation under a recrystallizing temperature can be used as a stiffening method, too. Though a steel pipe must have some elongation from the standpoint of the JIS, the elongation of the end portion 3a of the metal pipe is restricted due to the above-mentioned treatment. The adhesive is to be painted on the end portion 3a to be stiffened, over the length L1. It is impossible technically to stiffen only the range of the length L1. However, there is no problem with stiffening a little wider range than the length L1. The range to be stiffened is at least the length L1. A wider range than the length L1 (for example, 1.5 times of the length L1) can be also stiffened. For quenching, it is good to use a high frequency quenching for instantly heating and cooling only a required portion.

It is good to stiffen the circumference of the end portion 3a by cold working as a substitute for quenching.

The outer circumference of a carbon steel pipe in compliance with the JIS (such as SGP (Carbon-steel piping), STPG (Carbon steel pipe for pressure), STS (Carbon steel pipes for high pressure piping)) is not always completely round. Therefore, when the end portion 3a is not formed as a completely round right circular cylinder surface, the metal pipe 3 is made circular with a lathe.

(Modified Example 1 of the Metal Insertion Coupling)

Figure 6:
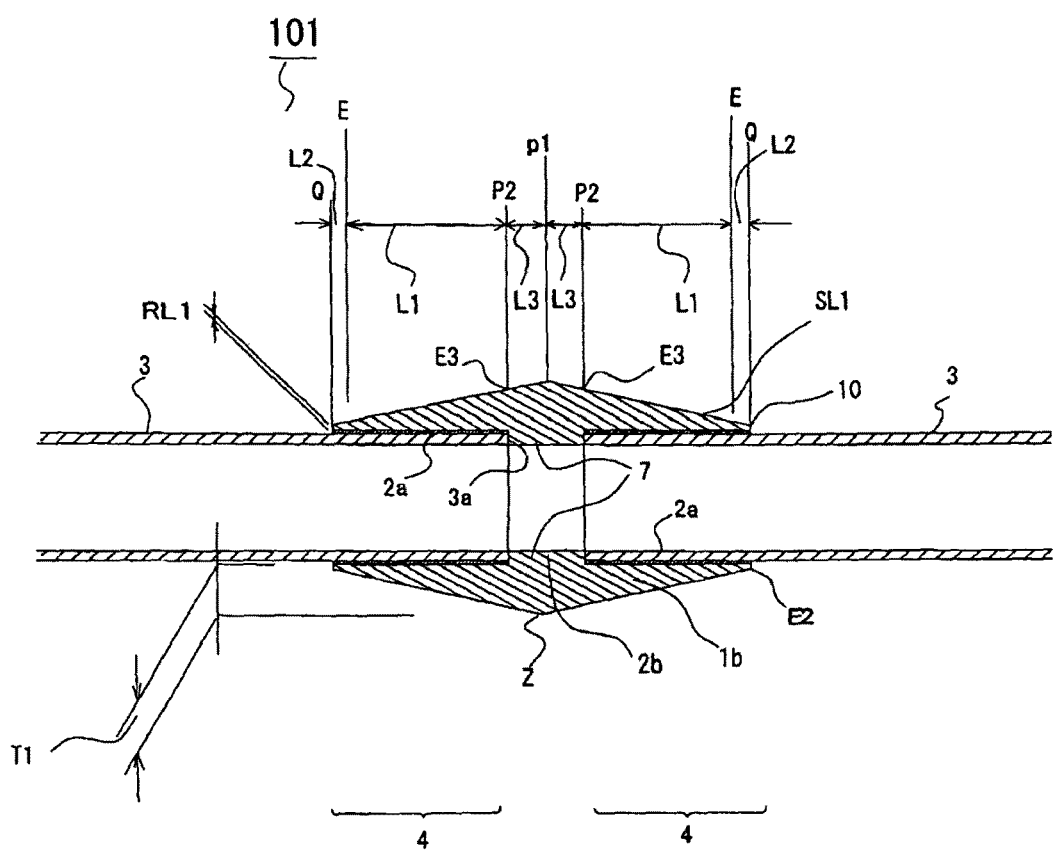
FIG. 6 is a sectional view showing another bonding structure in accordance with the present invention.

FIG. 6 is a sectional view showing a bonding structure 101 relating to a modified example. The deepest position p2 of each socket portion 4 does not correspond to the portion p1 at the center of the metal insertion couple 1b, but is displaced from the portion p1 toward the opening side of the socket portion 4 by an adequate length L3. The distance between the deepest position p2 of each of the right and left socket portions 4 and the corresponding portion E is set at a length L1, as in the case of FIG. 1. Accordingly, in the bonding structure 101, the distance between the position E in a left half area of the metal insertion couple 1b and the position E of a right half area thereof is lengthened by twice the distance L3 compared with the coupling of FIG. 1.

An inner surface portion 7 is formed at the deepest position p2 in the left half area and the deepest position p2 in the right half area. The diameter of a hole portion 2b formed by the inner surface portions 7, 7 is smaller than that of the circumference of the insertion hole 2a, and larger than the diameter of the inner hole of the metal pipe 3 to be inserted into the insertion hole 2a.

The length L2 from the position E to the opening end surface is 0.2 times the length L1. The radial length RL1 from the inner circumference to the outer circumference of the insertion hole 2a in the opening end surface 10 is, for example, 0.5 mm-3 mm in the effective handling. The straight line SL1 connecting the position E2 of the outer circumference of the opening end surface 10 and the position Z is along a tapered surface forming the outer circumference of the corresponding socket portion 4. In FIG. 6, the same reference numbers are used as are used to mark the corresponding portions of the metal insertion coupling 1a.

According to this modified example, when the end portion 3a of the metal pipe 3 is inserted into the insertion hole 2a of the corresponding socket portion 4, the tip of the end portion 3a contacts the inner surface portion 7. Even if the end portion 3a continues to be pushed, further insertion is prevented, and the metal pipe 3 is located precisely at the predetermined position. Therefore, even if the distance over which the metal pipe 3 is pushed into the socket portion 4 is not measured by a measuring instrument, both the metal pipe 3 and the socket portion 4 can be arranged precisely relative to one another. Another point is constructed according to the case of FIG. 1. Since it does not affect the strength of the coupling, the length L3 can be arbitrarily selected.

(Modified Example 2 of the Metal Insertion Coupling)

Figure 7:
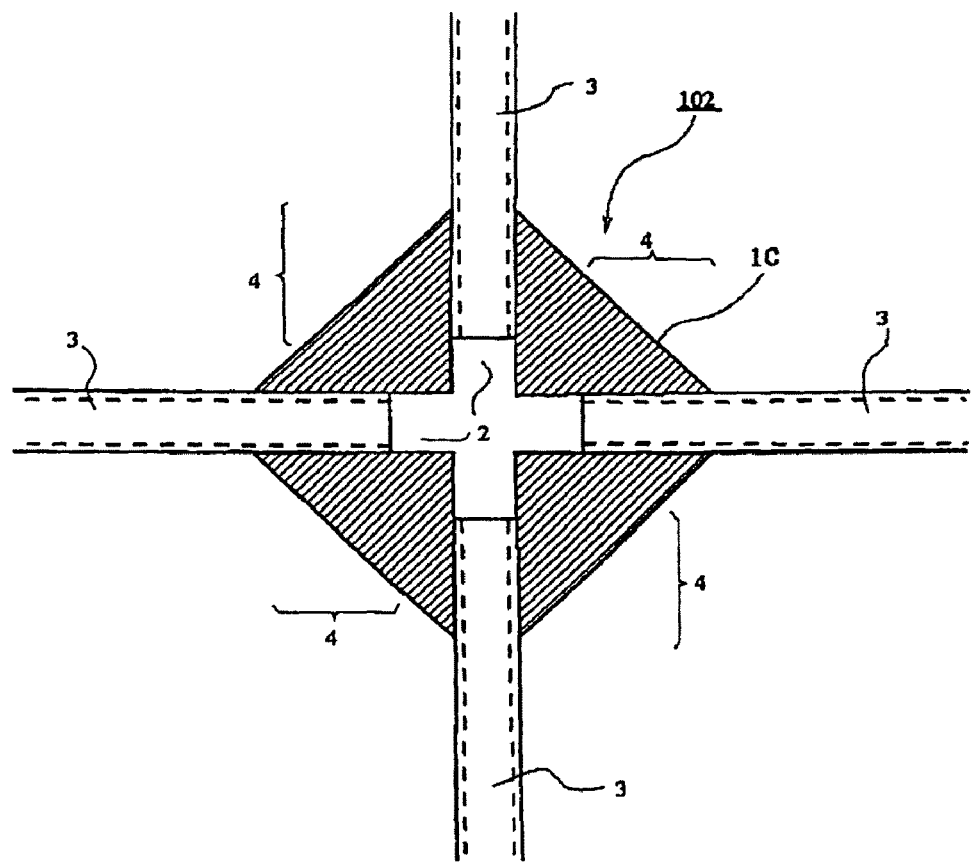
FIG. 7 is a sectional view showing yet another bonding structure in accordance with the present invention.
Figure 8:
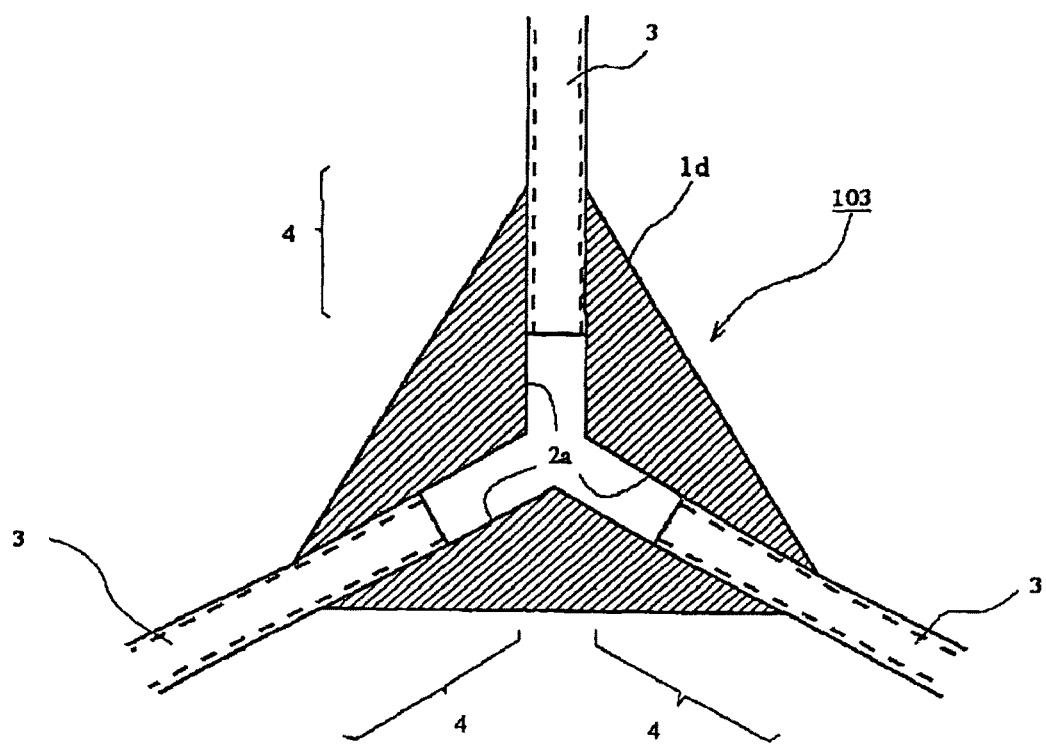
FIG. 8 is a sectional view showing still another bonding structure in accordance with the present invention.

FIG. 7 shows a bonding structure 102 relating to another modified example. A metal insertion coupling 1c to be used for the bonding structure 102 has end portions in four different directions forming a socket portion 4, which bonds four metal pipes 3 in a cross-shape. FIG. 8 shows a bonding structure 103 relating to another modified example. The bonding structure 103 is for bonding three metal pipes 3 in a 'Y' shape with a metal insertion coupling 1d having socket portions 4 in three different directions. Two metal pipes 3 may be deformed to bond in an 'L' shape with a metal insertion coupling having two socket portions 4 whose center lines intersect at right angles.

(Modified Example 3 of the Metal Insertion Coupling)

Figure 9:
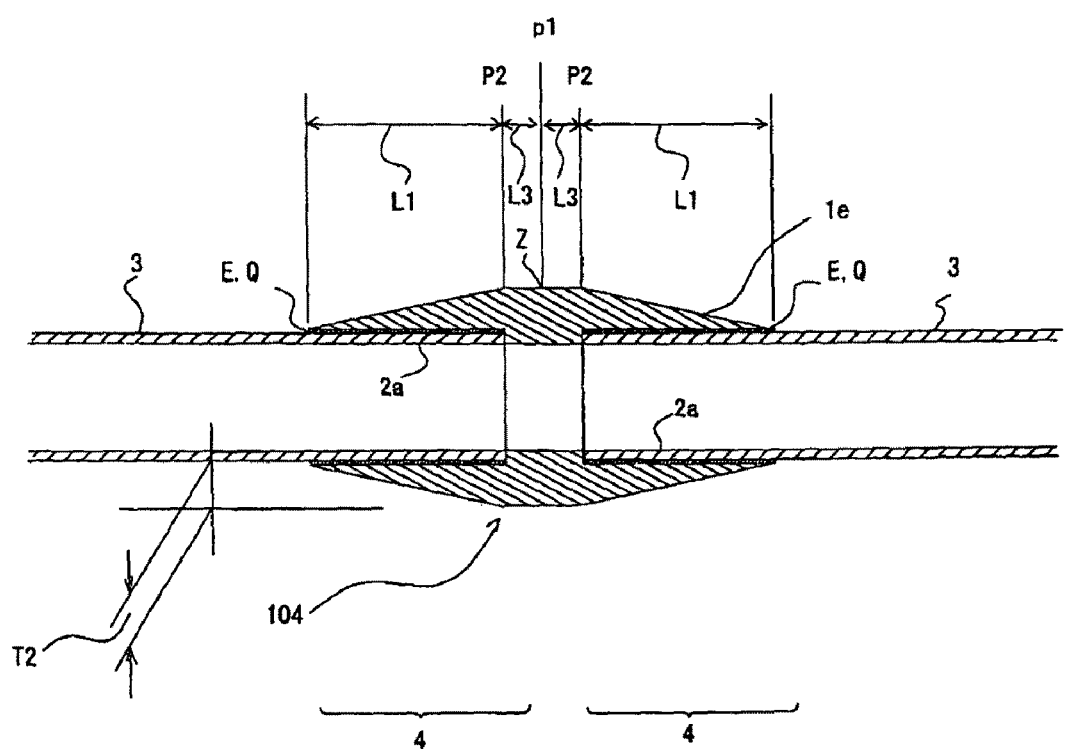
FIG. 9 is a sectional view showing another bonding structure in accordance with the present invention.

FIG. 9 is a sectional view of a bonding structure 104 relating to another modified example.

In FIG. 9, as in the case of FIG. 1, a central portion p1 in the direction of the length of a metal insertion coupling 1e is positioned at the deepest position of the socket portion 4 of each of the right and left sides. The thickness T2 at the position p2 of the metal insertion coupling 1e has a tensile strength equal to or higher than the tensile strength of the metal pipe 3. For example, the thickness T2 is made greater than the thickness of the metal pipe 3. The opening end Q corresponds to the position E, and therefore, the interval between the right position p1 and the left position p1 remains at the thickness T2.

EXPERIMENTAL EXAMPLES

The inventors bonded two metal pipes (SGP20A) 3, 3 with the adhesive "Scotch-WeldXA7416" made by Sumitomo 3M in the metal insertion coupling 1b of FIG. 6 and performed a tensile test. In this bonding structure, the adhesive length L1 of the end portion 3a was determined to be 38 mm (L2=0 mm) from the strength calculation. The taper angle was set at 7 degrees. In this experiment, the metal pipe and the coupling were fixed and bonded through the use of tools to keep an interval of 0.1 mm without ball members 5.

(1) The end portions 3a of the metal pipes 3 were bonded in the coupling 1b without quenching or cold working. Then, a tensile force in the direction of the center line CL was applied and increased. After the tensile force was more than 50 kN, the end portions 3a inserted into the insertion hole 2a spread and the diameters thereof decreased. In this case, the adhesive bonding between the circumference of the insertion hole 2a and the end portion 3a of the metal pipe 3 was destroyed, and the end portion separated from the insertion hole.

(2) Quenching was tried around the end portions 3a of the metal pipe 3 (in the range of the 1.5 times as much as the length of the end portion 3a to be inserted into the insertion hole). When the tensile force in the direction of the center line CL reached 85 kN, the bonding structure between the metal insertion coupling 1b and the metal pipe 3 was not ruptured, whereas the basic material portion of the metal pipe 3 was ruptured.

(3) The inventors investigated the tensile force that ruptured an adhesive surface having the same adhesive area (L1=38 mm) as in experimental example (1) for a steel pipe having the same diameter and higher strength than the SGP20A (STPT410, SCH160) in order to measure the bonding strength. As a result, when the tensile force was over 150 kN, the adhesive surface ruptured. The thickness was controlled to be 0.1 mm, as in experimental example (1). After the rupturing test, the thickness of the adhesive surface was measured and found to be about 0.15 mm by a micrometer.

According to the experiment, the bonding strength τ of the adhesive was 46.2 MPa that 150 kN, which is a rupturing load of the adhesive surface in using the metal pipe 3 (STPT410, SCH160), is divided by 3246 mm$^2$, which is the adhesive area.

The adhesive length L1 for an optional metal pipe to be bonded is calculated by dividing a rupturing force F1 of the metal pipe by 46.2 MPA, the bonding strength τ of the adhesive, which is found in the experiment, and the inner circumference 1 of the metal pipe 3 (πr, where r is the outer diameter of the metal pipe).

Figure 10:
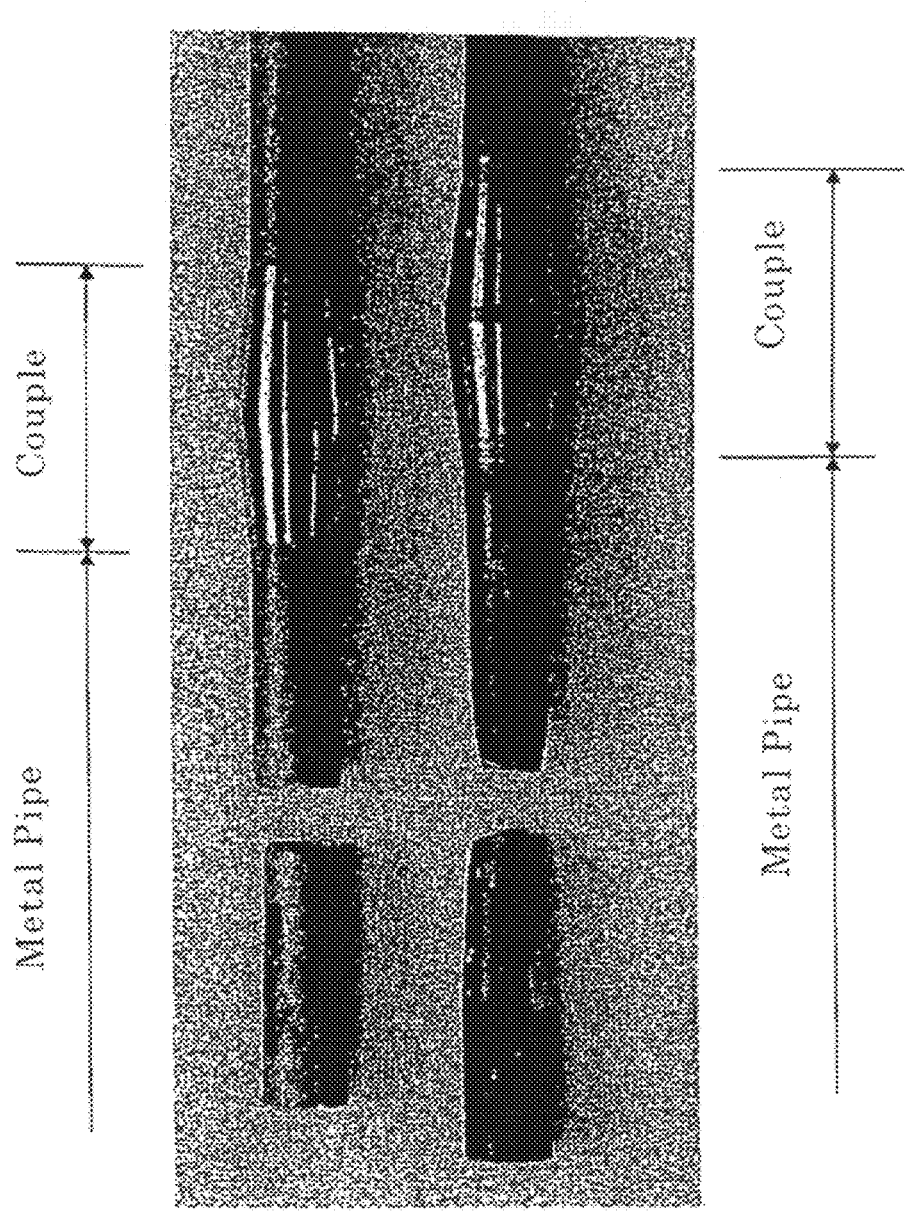
FIG. 10 shows pipes coupled in accordance with the present invention after a tensile strength test.

The bonding structure 101 of the quenched coupling 1b can be used as a strength member for a tensile test. When an 85 kN tensile test was performed for the quenched metal pipe (SGP20A), not the coupling but the metal pipe side was ruptured. This is shown in FIG. 10.

(An Example Applied to a Metal Board)

Figure 11:
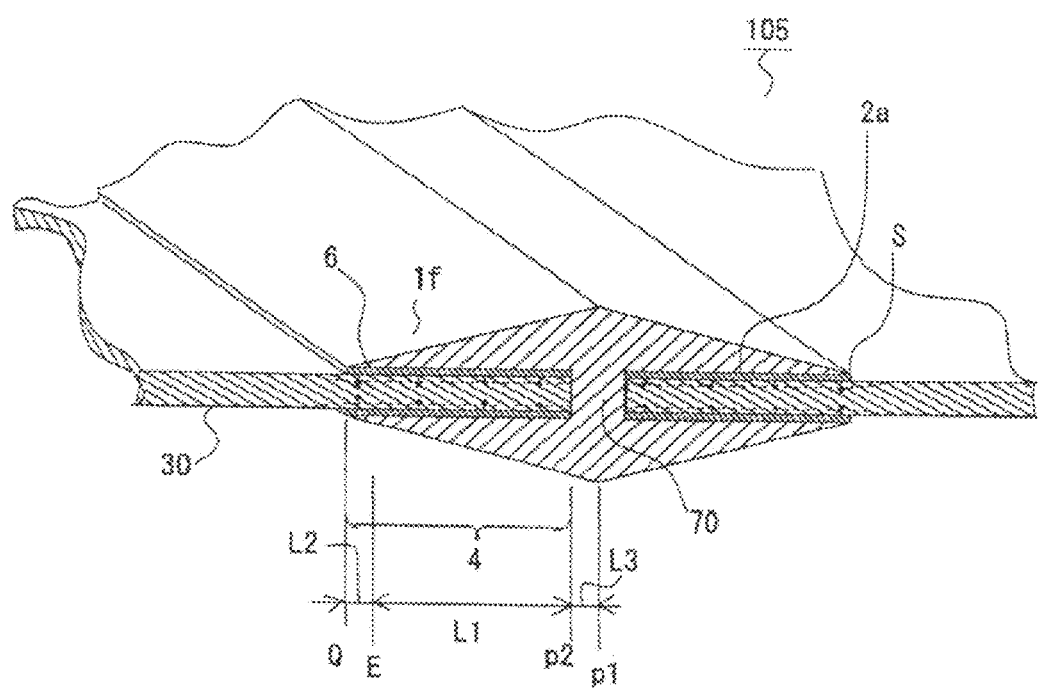
FIG. 11 is a sectional view showing another bonding structure in accordance with the present invention.

Also for a metal board, a transformation occurs on an adhesive portion 6 by adding tensile strength. FIG. 11 shows a bonding structure 105 for bonding metal boards. In the figure, as shown by a broken line S, a stress such that the thickness is reduced is generated by adding tensile force to the right and left sides of a metal board 30.

The stress is dispersed by tapering the top and bottom of the socket portion of the coupling. However, the distortion observed at the end portion of the socket portion 4 is large, and the force acts in a direction for exfoliating the adhesive surface.

In this embodiment, the reference numbers are the same as reference numbers marking corresponding portions of the metal insertion coupling 1a. As shown in FIG. 11, the socket portion 4 of the metal insertion coupling if is displaced from the position p1 of the center of the coupling 1f by a suitable distance L3, by which the deepest position p2 of each socket portion 4 does not coincide with the position p1. The distance between the deepest positions p2 of the socket portions 4 of the right and left sides of the coupling 1f is the same length L1 as in the case of FIG. 1.

A connecting portion 70 is formed between the deepest position p2 of the socket portion 4 within the left half of the coupling 1f and the deepest position p2 of the socket portion 4 within the right half thereof, and the top and bottom tapered surfaces are connected at the position p1.

In this embodiment, too, the end portion of the metal board is quenched or cold-worked, and therefore, the bonding portion is restricted from transformation. As a result, if the adhesive area is so determined that the length L1 is kept greater than a length that would have a tensile strength equal to the tensile strength of the metal board, the basic member of the metal board is ruptured when the tensile force is added. Therefore, boards can be secured with the efficiency of a coupling.

The insertion hole 2a for inserting the metal board 30 preferably has at least two facing planes. In the relationship between the thickness of the metal board 30 and the width of the insertion hole 2a of the socket portion 4, the width of the opening is 0.2-0.6 mm greater than the thickness of the metal board, the same as another bonding structure according to the present invention.

Figure 12:
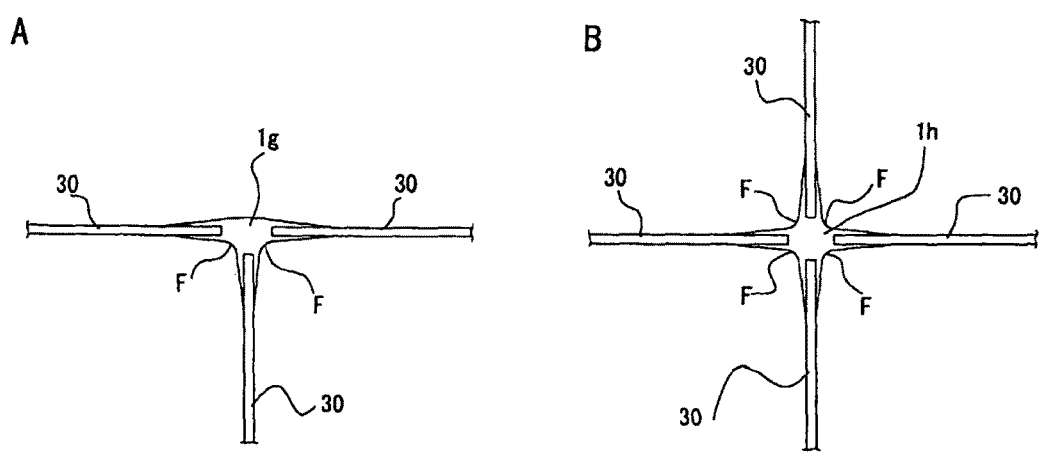
FIG. 12A is a sectional view showing another bonding structure in accordance with the present invention.
FIG. 12B is a sectional view showing another bonding structure in accordance with the present invention.

A modified example of the coupling of FIG. 11 is shown in FIGS. 12A and 12B. The coupling 1f can be applied to a coupling 1g having a socket in a 'T' shape, as shown in FIG. 12A, or to a coupling 1h having a socket in a cross shape as shown in FIG. 12B. For both the coupling in the 'T' shape and the coupling in the cross shape, a portion F for connecting to a slope of the tapered surface is preferably continuously connected by a curved surface. If portion F has an angle, a stress concentration results.

(Another Method for Preventing the Transformation)

Figure 13:
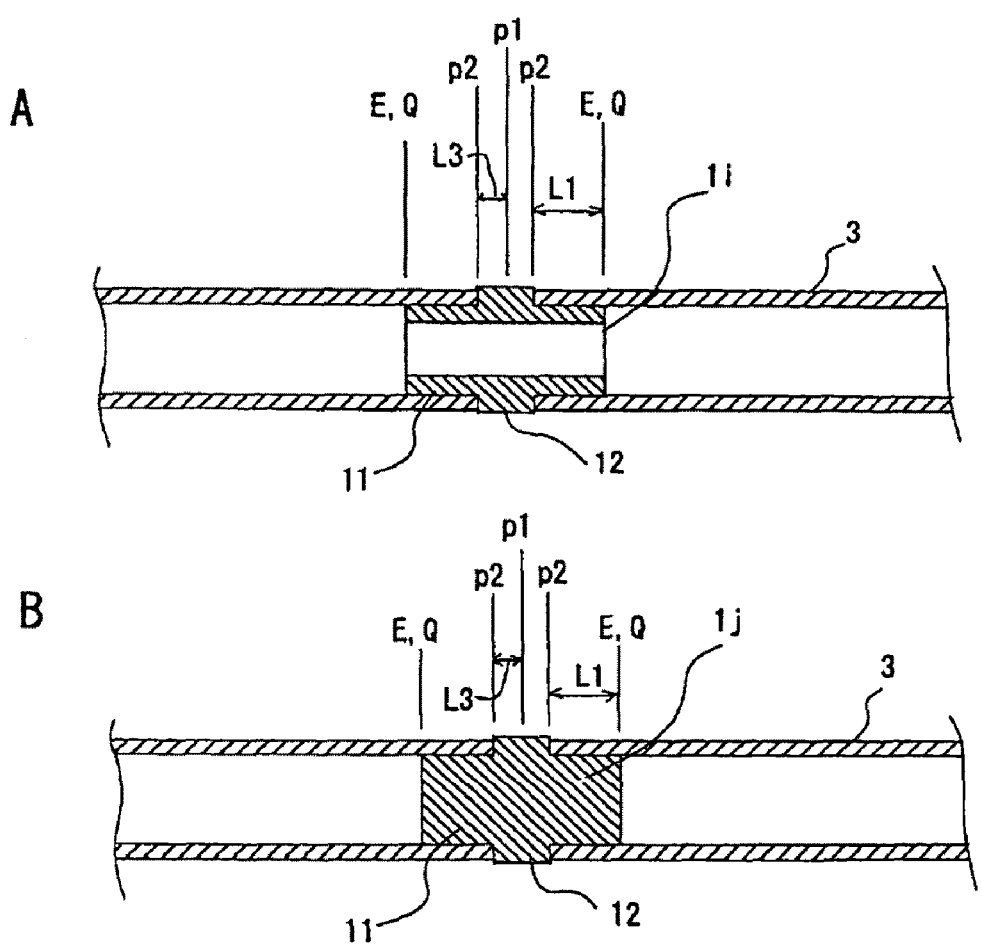
FIG. 13A is a sectional view showing another bonding structure in accordance with the present invention.
FIG. 13B is a sectional view showing another bonding structure in accordance with the present invention.

Although quenching (including carburization) and cold working have been described as methods for making the metal pipe hard to transform by applying tensile force, the transformation can be also controlled by inserting a metallic column member into the metal pipe, as shown in FIGS. 13A and 13B.

That is, although the metal pipe 3 is extended by the tensile force and has its diameter reduced, it can resist reduction of its diameter because there is a column member 11 in the pipe. In FIGS. 13A and 13B, the reference numbers are the same as reference numbers marking corresponding portions of the above-mentioned embodiment. Each of the couplings 1i, 1j has a column member 11 having both ends inserted into metal pipes 3, and unlike the above-mentioned couplings, which are bonded from the outside of the metal pipe or the metal board, the couplings 1i, 1j do not have a taper shape. The base p2 of the column member 11 does not coincide with the center position p1 of each of the couplings 1i, 1j, but is displaced from the position p1 by the distance L3. The interval distance between each of the right and left positions p2 of the couplings 1i, 1j and the tip position E of the cylinder is made the same length L1 as in the embodiment shown in FIG. 1.

A flange 12 having a larger diameter is formed between the right and left positions p2, which are at the bottoms of the right and left column members 11. The diameter of the flange is made larger than the diameter of an inner hole of the metal pipe 3.

The outer diameter of the column member 11 is smaller than the inner diameter of the metal pipe by 0.2-0.6 mm to control the radial dimension of the opening for the adhesive to 0.1-0.3 mm. According to this coupling, it is possible to control the transformation of the bonding portion of the metal pipe 3 due to tensile force without quenching or cold working. Therefore, the strength of the adhesive surface can be secured.

As for the column member 11 and the flange 12, a hollow one as shown in FIG. 13A and a solid one of steel as shown in FIG. 13B can be used.

The reference numbers are the same as reference numbers marking corresponding portions in FIGS. 1-12, and so the explanation is simplified.

The invention claimed is:

1. A method for bonding a metal member comprising:
  forming a metal insertion coupling having a socket portion;
  forming the socket portion with an insertion hole in which an end portion of a metal member is inserted and bonded with adhesive, wherein the tensile strength of the socket portion at its deepest portion in the direction of the center line of the insertion hole is equal to or higher than the tensile strength of the metal member in the direction of the center line;
  forming an outer surface of the socket portion with a tapered surface increasing gradually from an opening end to a back side;
  forming the insertion hole to have a width in the range of 0.2 mm-0.6 mm larger than the end portion of the metal member;
  quenching or cold working the end portion of the metal member;
  pressing the end portion of the metal member into the insertion hole; and densely providing an adhesive between the end portion of the metal member and an inner surface of the insertion hole.

2. A method for bonding a metal member to be bonded as claimed in claim 1, wherein an area over which the adhesive between the end portion of the metal member and the inner surface of the insertion hole is provided is determined such that the area multiplied by the shearing stress per unit area that causes the adhesive to rupture is greater than the tensile strength of the metal member in the direction of the center line.

3. A method for bonding a metal member as claimed in claim 1, wherein the metal member is a metal pipe.

4. A method for bonding a metal member as claimed in claim 1, wherein ball members each having a diameter smaller than half of the difference between the width of the insertion hole and the width of the end portion of the metal member are located between an outer surface of the end portion of the metal member and the surface of the insertion hole in a monolayer and separately.

5. A method for bonding a metal member as claimed in claim 1, wherein the ball members are adhered with the adhesive in a monolayer to the outer surface of the end portion of the metal member or the inner surface of the insertion hole, and thereafter, the end portion of the metal member is pressed into and bonded to the socket portion after applying the adhesive to the whole surface of the outer circumference of the end portion and/or the inner surface of the insertion hole.

6. A method for bonding a metal member as claimed in claim 4, wherein the ball members are made of metal, glass or ceramics.

7. A method for bonding a metal member as claimed in claim 5, wherein the ball members are made of metal, glass or ceramics.

* * * * *